US012469998B2

(12) United States Patent
Yang et al.

(10) Patent No.: US 12,469,998 B2
(45) Date of Patent: Nov. 11, 2025

(54) ROBUST CARD EDGE CONNECTOR WITH IMPROVED LATCHING STRUCTURE

(71) Applicant: Amphenol Commercial Products (Chengdu) Co., Ltd., Chengdu (CN)

(72) Inventors: Kui Yang, Chengdu (CN); Xiaodong Hu, Chengdu (CN)

(73) Assignee: Amphenol Commercial Products (Chengdu) Co., Ltd., Chengdu (CN)

(*) Notice: Subject to any disclaimer, the term of this patent is extended or adjusted under 35 U.S.C. 154(b) by 436 days.

(21) Appl. No.: 17/988,330

(22) Filed: Nov. 16, 2022

(65) Prior Publication Data

US 2023/0163500 A1 May 25, 2023

(30) Foreign Application Priority Data

Nov. 22, 2021 (CN) ......................... 202111401561.9
Nov. 22, 2021 (CN) ......................... 202122864517.3

(51) Int. Cl.
*H01R 12/72* (2011.01)
*H01R 12/70* (2011.01)

(52) U.S. Cl.
CPC ....... *H01R 12/721* (2013.01); *H01R 12/7023* (2013.01)

(58) Field of Classification Search
CPC .......................... H01R 12/721; H01R 12/7023
USPC ............................................................ 439/59
See application file for complete search history.

(56) References Cited

U.S. PATENT DOCUMENTS 3,573,706 A 4/1971 Haberlen
3,970,353 A 7/1976 Kaufman
4,241,966 A * 12/1980 Gomez .............. H01R 12/7005 439/372

(Continued)

FOREIGN PATENT DOCUMENTS

CN 1175101 A 3/1998
CN 2819526 Y * 9/2006 ......... H01R 12/7011

(Continued)

OTHER PUBLICATIONS

International Search Report and Written Opinion mailed Nov. 29, 2021 for International Application No. PCT/CN2021/114671.

(Continued)

*Primary Examiner* — Peter G Leigh
(74) *Attorney, Agent, or Firm* — Wolf, Greenfield & Sacks, P.C.

(57) ABSTRACT

A card edge connector with latches that improve the connector's reliability. The connector comprises a housing having a slot elongated in a longitudinal direction and a pair of towers disposed on opposite ends of the housing and extending in a vertical direction. A pair of latches are disposed in the towers, respectively. Each latch has a groove disposed above the respective tower for receiving a flange of a card inserted in the slot. Each latch has a clip disposed in its groove for engaging the flange of the card. The clips are configured to restrain movement of the card in the longitudinal direction, the vertical direction, and a transverse direction perpendicular to the longitudinal and vertical directions when the latches are in locked positions. Such a configuration enables more reliable connections and improves the connector's shock resistance while being compatible with cards having a variety of thicknesses.

20 Claims, 14 Drawing Sheets

(56) References Cited

U.S. PATENT DOCUMENTS

| | | | | |
|---|---|---|---|---|
| 4,487,468 | A | 12/1984 | Fedder et al. | |
| 4,734,041 | A | 3/1988 | Bruchmann et al. | |
| 5,211,568 | A * | 5/1993 | Yamada | H01R 13/633 439/153 |
| 5,393,247 | A | 2/1995 | DiOrazio et al. | |
| 5,429,523 | A * | 7/1995 | Tondreault | H01R 12/7005 439/157 |
| 5,542,854 | A * | 8/1996 | Bowen | H01R 12/7005 439/157 |
| 5,580,257 | A | 12/1996 | Harwath | |
| 5,810,623 | A | 9/1998 | Regnier et al. | |
| 5,876,214 | A | 3/1999 | McHugh et al. | |
| 5,997,312 | A | 12/1999 | Ho et al. | |
| 6,638,105 | B1 | 10/2003 | Wu | |
| 6,645,012 | B2 | 11/2003 | Ito et al. | |
| 6,648,682 | B1 | 11/2003 | Wu | |
| 6,749,463 | B1 | 6/2004 | Fan | |
| 6,824,413 | B1 * | 11/2004 | Shipe | H01R 12/7005 439/157 |
| 7,008,250 | B2 | 3/2006 | Shuey et al. | |
| 7,008,267 | B2 | 3/2006 | Fan | |
| 7,074,067 | B2 | 7/2006 | Yang et al. | |
| 7,438,569 | B2 * | 10/2008 | Pennypacker | H01R 13/6335 439/157 |
| 7,607,949 | B2 | 10/2009 | Hsu | |
| 7,637,783 | B2 | 12/2009 | Sasaoka et al. | |
| 7,645,150 | B1 * | 1/2010 | Chang | G06F 1/185 439/372 |
| 7,677,907 | B2 | 3/2010 | Guan et al. | |
| 7,731,541 | B1 | 6/2010 | Lee et al. | |
| 7,892,006 | B2 | 2/2011 | Guan et al. | |
| 7,972,171 | B2 | 7/2011 | Teh | |
| 8,142,207 | B1 | 3/2012 | Ljubijankic et al. | |
| 8,157,576 | B2 * | 4/2012 | Fu | H01R 12/721 439/153 |
| 8,187,031 | B2 | 5/2012 | Li et al. | |
| 8,328,567 | B1 * | 12/2012 | Yang | H01R 12/7005 439/157 |
| 8,403,689 | B2 | 3/2013 | Li et al. | |
| 8,535,077 | B2 | 9/2013 | Shen et al. | |
| 9,166,317 | B2 | 10/2015 | Briant et al. | |
| 9,325,090 | B2 | 4/2016 | Shen et al. | |
| 9,685,723 | B2 | 6/2017 | Kee Mew | |
| 9,887,485 | B2 | 2/2018 | Lambie et al. | |
| 10,103,476 | B1 | 10/2018 | Qiu et al. | |
| 10,135,165 | B2 | 11/2018 | Zuo | |
| 10,224,653 | B2 | 3/2019 | Niu et al. | |
| 10,741,944 | B2 | 8/2020 | Long | |
| 10,855,020 | B1 | 12/2020 | Phillips et al. | |
| 11,374,340 | B2 | 6/2022 | Tang | |
| 2005/0042928 | A1 | 2/2005 | Yi et al. | |
| 2005/0196992 | A1 * | 9/2005 | Tanigawa | H01R 13/6275 439/160 |
| 2007/0173118 | A1 | 7/2007 | Chen | |
| 2008/0064240 | A1 * | 3/2008 | Pennypacker | H01R 13/6335 439/157 |
| 2009/0077293 | A1 * | 3/2009 | Kerrigan | H05K 7/1409 710/301 |
| 2009/0186502 | A1 * | 7/2009 | Chen | H01R 12/721 439/157 |
| 2010/0075538 | A1 | 3/2010 | Ohshida | |
| 2011/0021080 | A1 | 1/2011 | Kamiya et al. | |
| 2011/0065297 | A1 | 3/2011 | Guan et al. | |
| 2011/0097913 | A1 * | 4/2011 | Fu | H01R 12/7005 439/153 |
| 2011/0104952 | A1 * | 5/2011 | Teh | H01R 12/737 439/633 |
| 2011/0136388 | A1 | 6/2011 | Fu et al. | |
| 2011/0275238 | A1 | 11/2011 | Iijima et al. | |
| 2012/0108092 | A1 * | 5/2012 | Li | H01R 12/737 439/159 |
| 2012/0156912 | A1 * | 6/2012 | Shen | H01R 13/6275 439/327 |
| 2012/0178274 | A1 * | 7/2012 | Manickam | H01R 12/7005 439/157 |
| 2012/0202387 | A1 | 8/2012 | McNamara | |
| 2012/0329301 | A1 * | 12/2012 | Li | H01R 12/721 439/157 |
| 2013/0059455 | A1 * | 3/2013 | Li | H01R 12/7005 439/157 |
| 2013/0130526 | A1 * | 5/2013 | Mo | H01R 13/62977 439/157 |
| 2013/0280926 | A1 | 10/2013 | Ono | |
| 2014/0213085 | A1 * | 7/2014 | Yao | H01R 13/7031 439/159 |
| 2016/0020540 | A1 | 1/2016 | Shen et al. | |
| 2016/0118736 | A1 | 4/2016 | Hoyack et al. | |
| 2016/0190724 | A1 | 6/2016 | Mito | |
| 2016/0336667 | A1 | 11/2016 | Kee Mew | |
| 2017/0012389 | A1 * | 1/2017 | Li | H01R 12/737 |
| 2017/0302031 | A1 | 10/2017 | Cheng et al. | |
| 2019/0165518 | A1 | 5/2019 | Hsu et al. | |
| 2019/0199023 | A1 * | 6/2019 | Soh | H01R 12/7064 |
| 2020/0076131 | A1 | 3/2020 | Hu et al. | |
| 2020/0203867 | A1 | 6/2020 | Lu | |
| 2021/0288423 | A1 | 9/2021 | Guo et al. | |
| 2021/0351529 | A1 | 11/2021 | Yang et al. | |
| 2021/0376508 | A1 | 12/2021 | Hu | |
| 2022/0037828 | A1 | 2/2022 | Hu et al. | |
| 2022/0069496 | A1 | 3/2022 | Yi et al. | |
| 2022/0181809 | A1 | 6/2022 | Xie et al. | |
| 2022/0181811 | A1 | 6/2022 | Liu et al. | |
| 2022/0247107 | A1 | 8/2022 | Tang et al. | |

FOREIGN PATENT DOCUMENTS

| | | | | |
|---|---|---|---|---|
| CN | 202633554 | U | 12/2012 | |
| CN | 203660106 | U | 6/2014 | |
| CN | 105703103 | A | 6/2016 | |
| CN | 108539464 | A | 9/2018 | |
| CN | 212874843 | U | 4/2021 | |
| CN | 214505858 | U | 10/2021 | |
| EP | 0820124 | A2 | 1/1998 | |
| GB | 227943 | A | 1/1925 | |
| JP | H01175180 | A * | 7/1989 | H01R 12/7005 |
| TW | 200835073 | A | 8/2008 | |
| TW | M475740 | U | 4/2014 | |
| WO | WO 02/073819 | A2 | 9/2002 | |

OTHER PUBLICATIONS

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].

[No Author Listed], DDR5 SDRAM—Wikipedia. Aug. 8, 2021. 6 pages. URL:https://en.wikipedia.org/wiki/DDR5_SDRAM [last accessed on Aug. 16, 2021].

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].

Armasu, What We Know About DDR5 So Far. Jun. 7, 2019. 20 pages. URL:https://www.tomshardware.com/news/what-we-know-ddr5-ram,39079.html [last accessed Jul. 21, 2022].

Hu, Electrical Connector For Compact System, U.S. Appl. No. 17/950,364, filed Sep. 22, 2022.

Yang et al., Electrical Connector, U.S. Appl. No. 17/973,913, filed Oct. 26, 2022.

(56) References Cited

OTHER PUBLICATIONS

Yang et al., Electrical Connector, U.S. Appl. No. 18/075,246, filed Dec. 5, 2022.
Yang et al., Field Installable Card Edge Connector, U.S. Appl. No. 18/101,998, filed Jan. 26, 2023.

* cited by examiner

ROBUST CARD EDGE CONNECTOR WITH IMPROVED LATCHING STRUCTURE

RELATED APPLICATIONS

This application claims priority to and the benefit of Chinese Patent Application Serial Nos. 202122864517.3 and 202111401561.9, both filed Nov. 22, 2021. The contents of these applications are incorporated herein by reference in their entirety.

FIELD

The present disclosure relates to interconnection systems, such as those including electrical connectors, used to interconnect electronic assemblies.

BACKGROUND

Electrical connectors are used in many electronic systems. It is generally easier and more cost effective to manufacture a system as separate electronic assemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

Computers, for example, are often manufactured with connectors that serve as sockets for memory cards. A memory card may contain one or multiple memory chips and may be inserted into a socket to increase the available memory in the computer. Memory cards generally have standardized electrical and mechanical interfaces, as do the memory sockets. Many memory cards, for example, are designed according to a DDR standard, such as DDR4 or DDR5.

Sockets according to those standards have a card slot to receive a memory card and make electrical connections to it. Such sockets typically have an ejector that is mounted at a pivot point in the socket. The upper end of the ejector may be rotated about that pivot point into a position where it engages an opening in the memory card, locking the memory card in the socket. When the upper end of the ejector is rotated away from the socket, the bottom end of the ejector rotates upwards from underneath the memory card, pushing the memory card upwards in the slot so that it can be removed from the socket.

BRIEF SUMMARY

Aspects of the present disclosure relate to robust electrical connectors.

Some embodiments relate to a latch assembly for a card edge connector, the card edge connector comprising a housing having a base portion extending in a longitudinal direction. The latch assembly may include a latch comprising a body portion comprising a first end and a second end; bearing surfaces on the body portion configured for engaging complementary bearing surfaces on the housing of the card edge connector to pivotably mount the latch in the housing such that the latch pivots between at least a locked position and an unlocked position; a foot extending from the body portion at the first end, the foot configured to extend under a portion of a card inserted in the card edge connector when the latch is pivoted into the locked position; and a head coupled to the body portion at the second end, the head configured to extend into a notch of a mating component mated to the card edge connector when the latch is pivoted into the locked position, wherein the head may comprise: a groove; and a clip disposed in the groove and configured for engaging a mating component when the mating component is inserted into the base portion of the card edge connector and the latch is pivoted into the locked position.

Optionally, the clip may be configured to restrain movement of the mating component in a transverse direction perpendicular to the longitudinal direction.

Optionally, the clip may be configured to restrain movement of the mating component in a vertical direction perpendicular to the longitudinal direction and transverse direction.

Optionally, the clip may comprise a body, and first and second beams configured to engage opposite sides of the mating component.

Optionally, the clip may comprise a body, first and second beams configured to engage one side and a top of the notch of the mating component.

Optionally, the groove of the latch may comprise first and second recessed portions; the first beam of the clip may be disposed in the first recessed portion; and the second beam of the clip may be disposed in the second recessed portion.

Optionally, each of the first and second beams of the clip may comprise a curved portion extending into the groove of the latch so as to engage the opposite sides of the mating component.

Optionally, each of the first and second beams of the clip may comprise an end portion extending from the curved portion and configured to guide the mating component to engage the curved portion.

Some embodiments relate to an electrical connector. The electrical connector may include a housing comprising a slot elongated in a longitudinal direction; a latch pivotably connected to the housing between a locked position and an unlocked position, the latch comprising an upper part having a groove facing the housing; and a clip comprising a body and a first beam and a second beam disposed on opposite sides of the groove for engaging a mating component inserted into the slot of the housing when the latch is in the locked position.

Optionally, the first beam may comprise a first curved portion; the second beam may comprise a second curved portion; and the first curved portion and the second curved portion may curve inwards the groove and extend into the groove so as to engage the mating component inserted into the slot of the housing when the latch is in the locked position.

Optionally, the first beam may further comprise a first end portion connected to the first curved portion; the second beam may further comprise a second end portion connected to the second curved portion; the first end portion and the second end portion may be positioned at a groove opening of the groove so as to form a clip opening of the clip; and a maximum width of the clip opening in a transverse direction perpendicular to the longitudinal direction may be bigger than a width of the groove opening in the transverse direction.

Optionally, the clip may further comprise a third beam disposed at a top of the groove.

Optionally, the third beam may comprise a third curved portion; the third curved portion may curve inwards the groove and extends into the groove; and a spacing between the third curved portion and a top of a flange of the mating component may be between −0.1 mm and 0.1 mm when the mating component is inserted into the slot and the latch is in the locked position.

Optionally, the clip further may comprise a first holding part and a second holding part connected to the body; and the first holding part and the second holding part may be fixed to the latch at a top of the groove; and the first holding part and the second holding part may be positioned above the first beam and the second beam, respectively.

Some embodiments relate to a system. The system may include an electrical connector of described herein; and a component inserted into the slot of the housing of the electrical connector. The first and second beams of the clip may engage the component from opposite sides so as to restrain movement of the component in a transverse direction perpendicular to the longitudinal direction.

Some embodiments relate to an electrical connector. The electrical connector may include a housing comprising a base portion extending in a longitudinal direction; a pair of latches pivotably disposed at opposite ends of the base portion of the housing, each of the pair of latches extending in a vertical direction perpendicular to the longitudinal direction and comprising a groove disposed above the base portion of the housing; and a pair of clips disposed in the grooves of respective ones of the pair of latches.

Optionally, the pair of clips may be configured to restrain movement of a mating component inserted in the base portion of the housing in the longitudinal direction, the vertical direction, and a transverse direction perpendicular to the longitudinal direction and the vertical direction when the pair of latches are in a locked position.

Optionally, each clip of the pair may comprise a body, first and second beams extending from opposite sides of the body, and a third beam extending from a top of the body and disposed between the first and second beams.

Optionally, each of the first, second and third beams may comprise a portion curving into the groove so as to engage the mating component from three different sides.

Some embodiments relate to a system. The system may include an electrical connector described herein; and a component inserted in the base portion of the housing of the electrical connector, wherein the pair of clips may restrain movement of the component in the longitudinal direction, the vertical direction, and a transverse direction perpendicular to the longitudinal direction and the vertical direction when the pair of latches are in a locked position.

Some embodiments relate to a electrical connector. The electrical connector may include an insulating housing and a latch. The insulating housing may be provided with a slot. The latch may be pivotally connected to the insulating housing between a locked position and an unlocked position. An upper part of the latch may be provided with a locking groove facing the insulating housing, and the locking groove may be configured for engaging a flange of a mating component inserted into the slot when the latch is at the locked position. The latch may be provided with a clip. The clip may comprise a clip main body and a first beam and a second beam which may extend from the clip main body. The first beam and the second beam may be positioned on opposite sides of the locking groove and configured to clamp the flange of the mating component.

Optionally, each of the first beam and the second beam may take a shape of an elastic beam.

Optionally, the first beam may comprise a first curved portion, the second beam may comprise a second curved portion, both the first curved portion and the second curved portion may curve toward the locking groove, and the first curved portion and the second curved portion may extend into the locking groove so as to clamp the flange of the mating component.

Optionally, the first beam may further comprise a first outer end portion connected to an outer end of the first curved portion, the second beam may further comprise a second outer end portion connected to an outer end of the second curved portion, the first outer end portion and the second outer end portion may be positioned adjacent a groove opening of the locking groove and form a clip opening of the clip, an outer side of the clip opening facing the locking groove may be of an incremental size, and a maximum width of the clip opening may be bigger than a width of the groove opening.

Optionally, the clip may further comprise a third beam connected to the clip main body, and the third beam may be positioned at a top of the locking groove.

Optionally, the third beam may take a shape of an elastic beam.

Optionally, the third beam may comprise a third curved portion, the third curved portion may curved toward the locking groove, and the third curved portion may extend into the locking groove.

Optionally, a spacing between the third curved portion and a top of the flange of the mating component may be between −0.1 mm and 0.1 mm.

Optionally, the latch may be further provided with a first fixing groove and a second fixing groove recessed towards opposite sides of the locking groove, and the first beam and the second beam may be respectively mounted to the first fixing groove and the second fixing groove.

Optionally, the clip main body and inner ends of the first beam and the second beam connected to the clip main body, may engage the first fixing groove and the second fixing groove.

Optionally, the clip may further comprise a first holding part and a second holding part connected to the clip main body, and the first holding part and the second holding part may be fixed to the latch at a top of the locking groove.

Optionally, the first holding part and the second holding part may be respectively positioned above the first beam and the second beam, and the first holding part and the second holding part may extend towards respective sides of the locking groove to exceed inner ends of the first beam and the second beam connected to the clip main body.

Optionally, the latch may be further provided with a third fixing groove and a fourth fixing groove recessed towards each side of the locking groove respectively, and outer edges of the first holding part and the second holding part may be respectively inserted into the third fixing groove and the fourth fixing groove, and the third fixing groove and the fourth fixing groove may respectively extend to a surface on which a groove opening of the locking groove is located.

Optionally, the clip further may comprise a third beam connected to the clip main body, and the third beam may be positioned between the first holding part and the second holding part.

Optionally, the first holding part and the second holding part may be spaced apart along a lateral direction of the locking groove so as to make the first holding part and the second holding part elastic.

Optionally, outer edges of the first holding part and the second holding part may be respectively provided with a first abutting protrusion and a second abutting protrusion, and the first abutting protrusion and the second abutting protrusion may respectively abut against groove walls of the third fixing groove and the fourth fixing groove.

Optionally, surfaces of the first abutting protrusion and the second abutting protrusion facing away from the groove opening may incline towards each other along a direction away from the groove opening.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1:
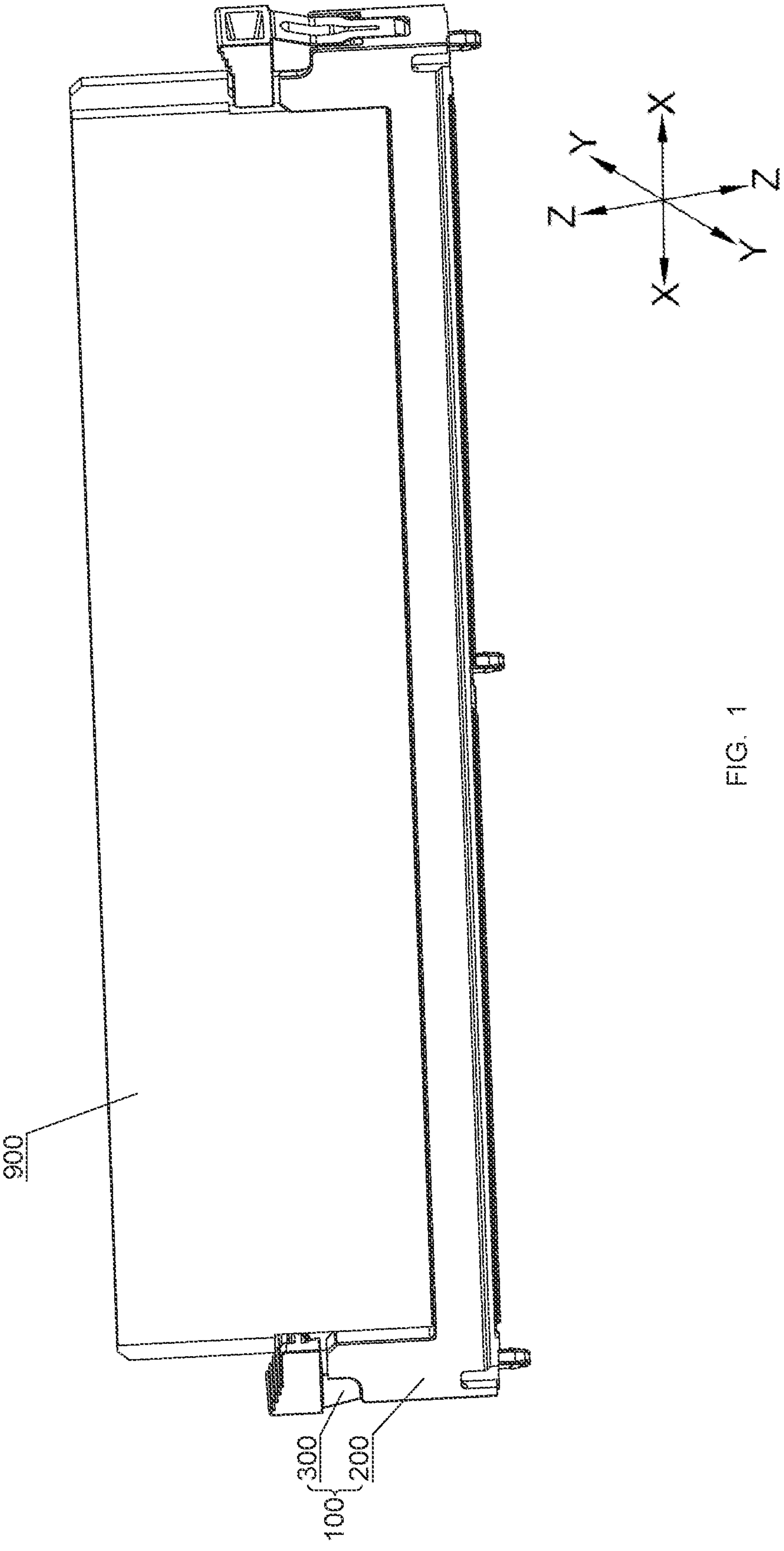
FIG. 1 is a perspective view of an electronic system, illustrating an electrical connector with latches in a locked position, according to some embodiments.

The above accompanying drawings include the following reference signs:

electrical connector 100; conductor 110; insulating housing 200; mating surface 201; mounting surface 202; slot 210; latch 300; locking groove 310; groove opening 311; first fixing groove 320; second fixing groove 330; third fixing groove 340; fourth fixing groove 350; tower 402; base portion 404; clip 400; clip main body 410; first beam 420; first curved portion 421; first outer end portion 422; second beam 430; second curved portion 431; second outer end portion 432; clip opening 440; third beam 450; third curved portion 451; first holding part 460; first abutting protrusion 462; surfaces 462*a*, 462*b*, 462*c*; second holding part 470; second abutting protrusion 472; surfaces 472*a*, 472*b*, 472*c*; bearing surface: 702; foot: 704; head: 706; electronic card 900; flange 910; and notch 920.

DETAILED DESCRIPTION

The Inventors have recognized and appreciated design techniques to enable more reliable connectors. The Inventors have recognized and appreciated that undesired movement of mated components in a system with respect to each other may occur during use of the system as a result of vibration, shaking, etc. For example, a card edge connector is an example of a connector used for interconnection of printed circuit boards in an electronic system. Dual In-line Memory Module (DIMM) is an example of a memory used in computers. DIMM may be connected to a mainboard of a computer through the card edge connector. The card edge connector may be mounted on the mainboard, and conductors on the card edge connector may be connected to a circuit of the mainboard. A DIMM, sometimes called a memory card, may be inserted into a slot of the card edge connector. To secure the connection between the memory card and the card edge connector, the card edge connector may include one or more latches. The latches may be pivotably disposed in respective towers at opposite ends of an insulating housing of the card edge connector. After the memory card is inserted into the insulating housing, the latches may be moved to locked positions such that the memory card is secured in the card edge connector.

The memory card may have notches on opposite sides corresponding to opposite sides of the slot of the card edge connector. When the latches are pivoted to the locked positions, parts of the latches may extend into the notches to engage edges of the notches so as to lock the memory card to the card edge connector. The Inventors have recognized and appreciated that the memory card may move relative to the card edge connector because of movement of the system such as vibration in a working environment, which may weaken the connection between the memory card and the card edge connector and/or disengage the card edge connector from the card edge connector. The Inventors have further recognized and appreciated that gaps may exist between side edges of the memory card and the latches, which may cause the memory card to move in the latch, even if a bottom edge of the memory card is clamped by conductive components of the connector when inserted into the slot of the insulating housing and mated with the conductive components. The Inventors have recognized and appreciated that reducing or eliminating the gaps between the memory card and the latches may reduce the risks that the memory card moves with respect to the card edge connector and therefore improve the stability of the interconnection system.

In an embodiment of the present disclosure, the latches may be provided with clips. The clips may be inserted into grooves of respective latches. When the memory card is inserted in the slot of the card edge connector, the clips may clamp respective side edges of the memory card, ensuring the connection between the latches and the memory card. The clips may be configured such that, when the latches are in locked positions, the clips restrain movement of the card from multiple directions, such as three different directions corresponding to the length, width, and height of the card edge connector. Such a configuration enables more reliable connections and improves the connector's shock resistance while being compatible with cards having a variety of thicknesses.

Figure 2:
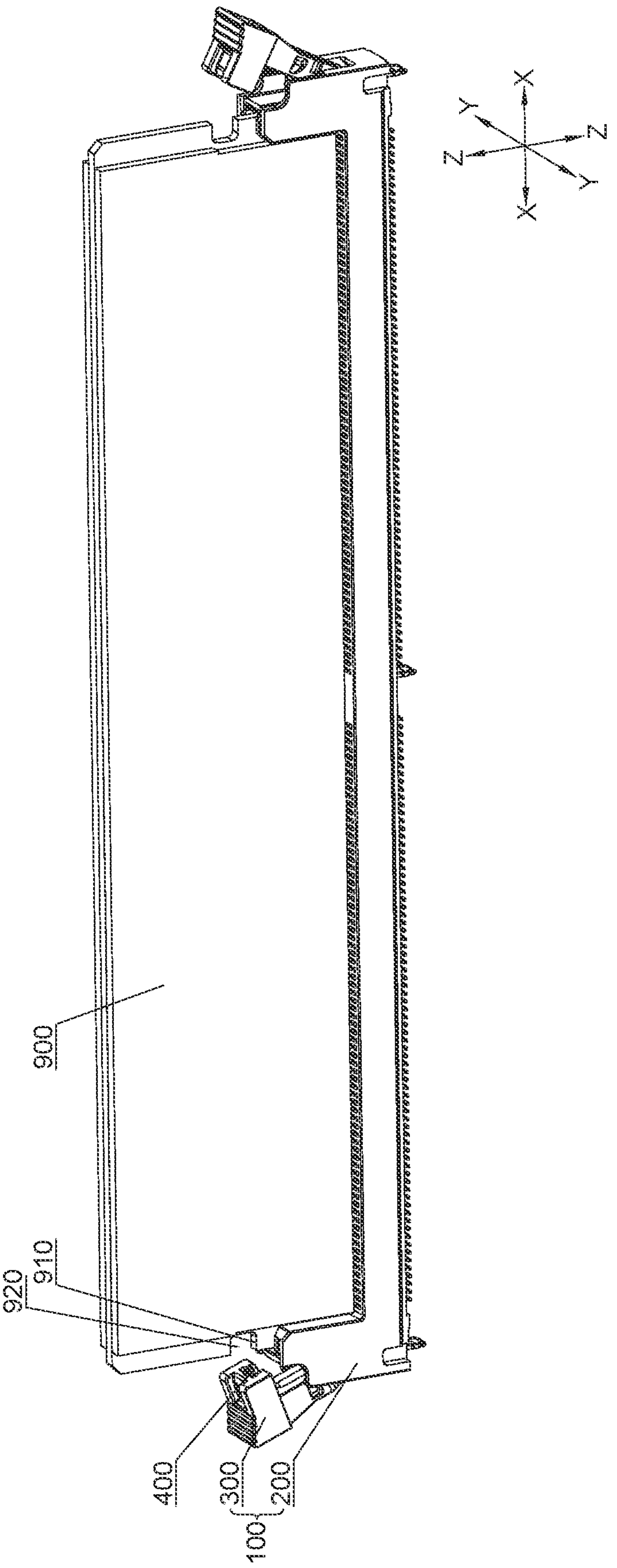
FIG. 2 is a perspective view of the electronic system shown in FIG. 1, illustrating the electrical connector with the latches in an unlocked position.
Figure 4:
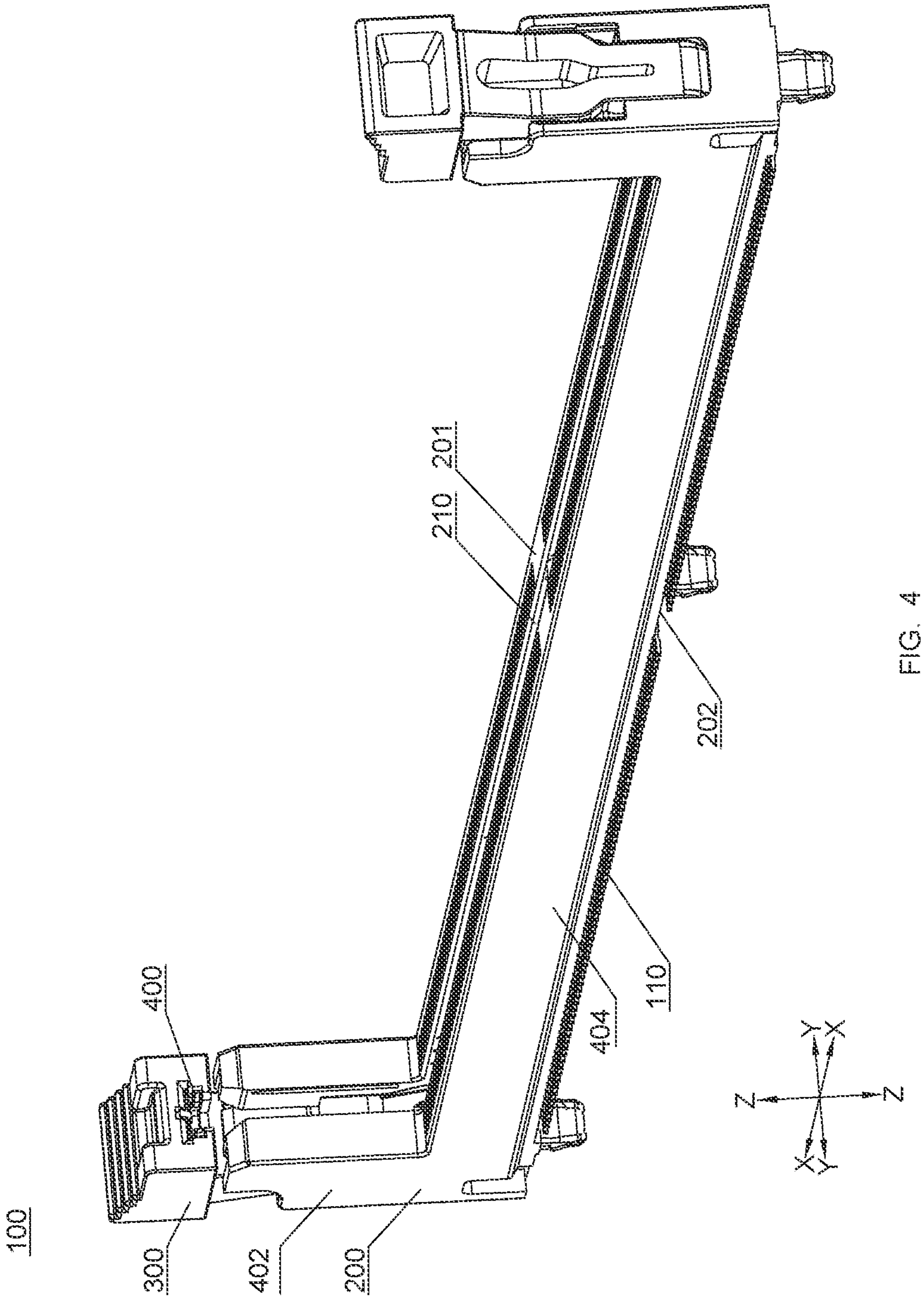
FIG. 4 is a perspective view of an electrical connector, according to some embodiments.
Figure 5:
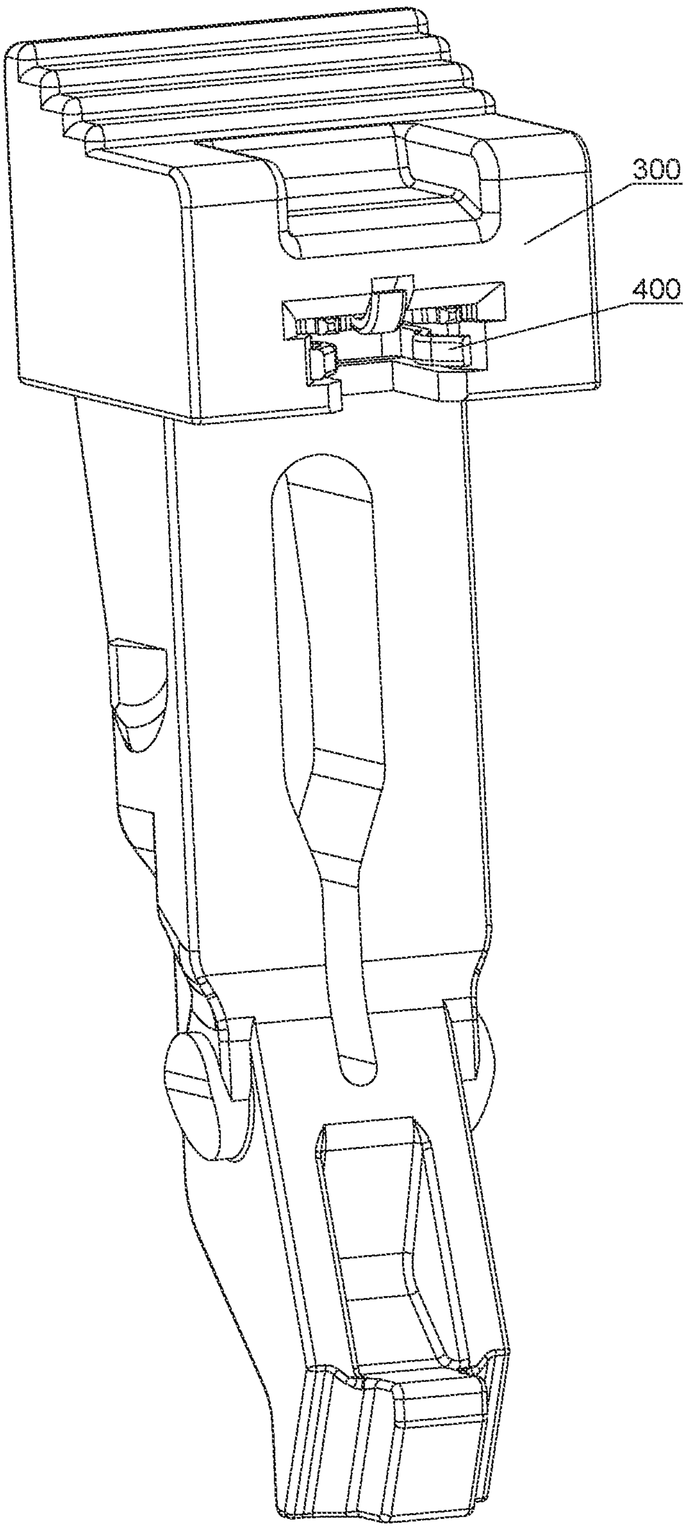
FIG. 5 is a front, side perspective view of a latch and a clip of the electrical connector shown in FIG. 4, according to some embodiments.
Figure 6:
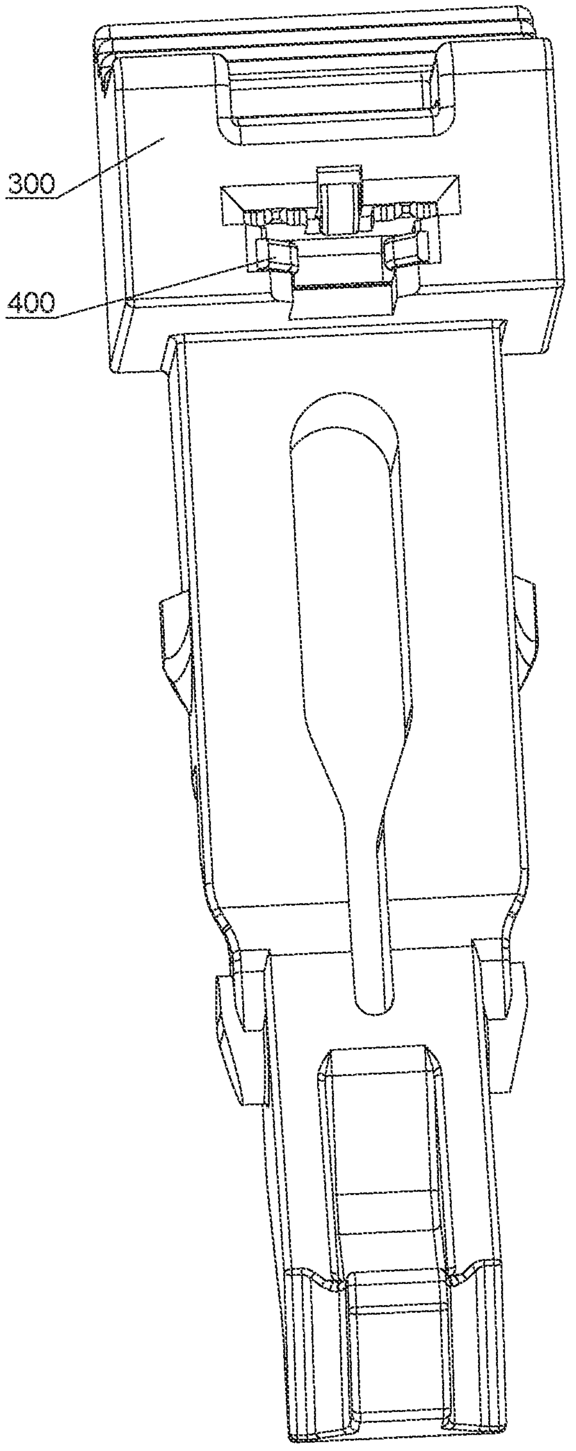
FIG. 6 is a front perspective view of the latch and the clip shown in FIG. 5.

Such techniques may be integrated into an electrical connector 100. As shown in FIGS. 1-2 and 4, the electrical connector 100 may include an insulating housing 200 and a latch 300. A vertical direction Z-Z, a longitudinal direction X-X and a transverse direction Y-Y are shown in the figures. The vertical direction Z-Z, the longitudinal direction X-X and the transverse direction Y-Y may be perpendicular each other. The vertical direction Z-Z may refer to a height direction of the electrical connector 100. The longitudinal direction X-X may refer to a length direction of the electrical connector 100. The transverse direction Y-Y may refer to a width direction of the electrical connector 100.

The insulating housing 200 may be provided with a mating surface 201 and a mounting surface 202, which may be opposite to each other along the vertical direction Z-Z. The mating surface 201 may be provided with a slot 210. Exemplarily, the slot 210 may be recessed inwards along the vertical direction Z-Z from the mating surface 201, to form a card slot. The slot 210 may be used for receiving a part of a mating component, to maintain the position of the mating component relative to the insulating housing 200. The mating component may include, but not limited to, an electronic card. The electronic card may include one or more of a display card, a memory card, a sound card and the like. Optionally, the mating component may further include a mated electrical connector. For example, if the electrical connector 100 is a socket electrical connector, the mated electrical connector may be a plug electrical connector. The principle of the present disclosure is described below with an example which takes an electronic card as the mating component.

The insulating housing 200 may have a longitudinal strip shape. The insulating housing 200 may include a base portion 404 extending in the longitudinal direction X-X and a pair of towers 402 disposed on opposite ends of the base portion 404. The slot 210 may be a long and thin slot extending in the longitudinal direction X-X. An electronic card 900 may be inserted into the card slot from the mating surface 201. As shown in FIG. 4, the mounting surface 202 may face a printed circuit board serving as a back plane, such that the electronic card 900 may be electrically connected to the printed circuit board by the electrical connector 100, and a circuit on the electronic card and a circuit on the printed circuit board may be interconnected. The insulating housing 200 may be provided with a plurality of conductors 110. The plurality of conductors 110 may be spaced apart from each other along the longitudinal direction X-X, such that adjacent conductors 110 may be electrically insulated from each other. The electronic card 900 may be provided with conductors (for example, golden fingers). When an edge of the electronic card 900 is inserted into the card slot, front ends of the plurality of conductors 110 may be electrically connected to the conductors on the electronic card 900. Rear ends of the plurality of conductors 110 may extend beyond the inserted edge of the electronic card 900. When the electrical connector 100 may be connected to the printed circuit board (not shown), rear ends of the plurality of conductors 110 may be electrically connected to the circuit on the printed circuit board.

Orientation terms used herein may be relative to the placement of the electrical connector 100 shown in FIGS. 1-2, i.e., the side on which the mating surface 201 may be located may be the up side and the side on which the opposite mounting surface 202 may be located may be the bottom side. Optionally, the slot 210 may extend along the longitudinal direction X-X. The insulating housing 200 may be molded from insulating materials such as plastic by a molding process. The insulating housing 200 may be an integral member.

A latch 300 may be pivotably connected to the insulating housing 200, for example, pivotably connected to an end part of the insulating housing 200. The latch 300 may be pivoted between a locked position and an unlocked position. In FIG. 1, the latch 300 may be at the locked position, and the latch 300 may lock the electronic card 900 to the electrical connector 100. In FIG. 2, the latch 300 may be at the unlocked position, the electronic card 900 may be inserted into the slot 210, or the electronic card 900 may be taken from the insulating housing 200. The latch 300 may be molded from insulating materials such as plastic by a molding process. The latch 300 may be an integral member. The latch 300 and the insulating housing 200 may be made of the same or different materials.

Figure 7:
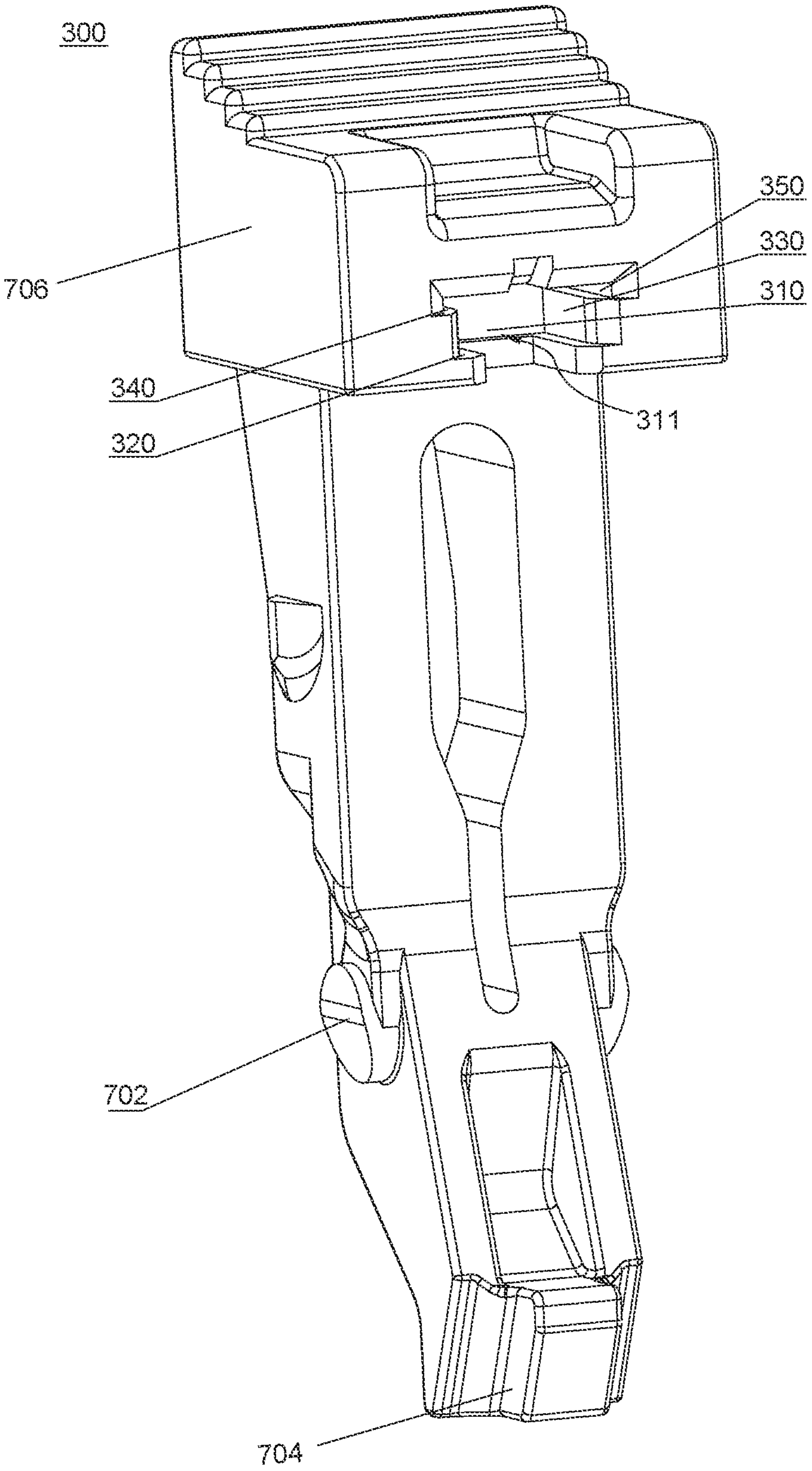
FIG. 7 is a front, side perspective view of the latch shown in FIG. 5.
Figure 8:
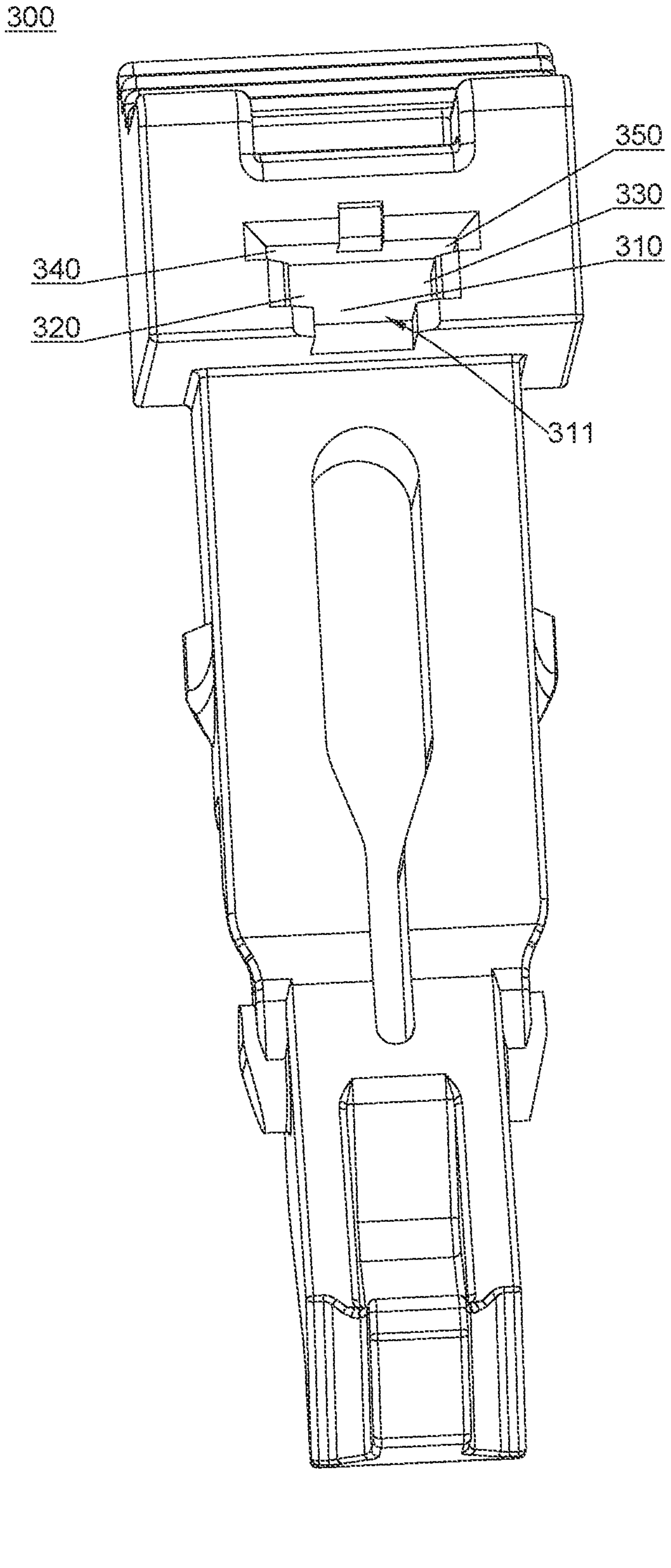
FIG. 8 is a front perspective view of the latch shown in FIG. 7.
Figure 9:
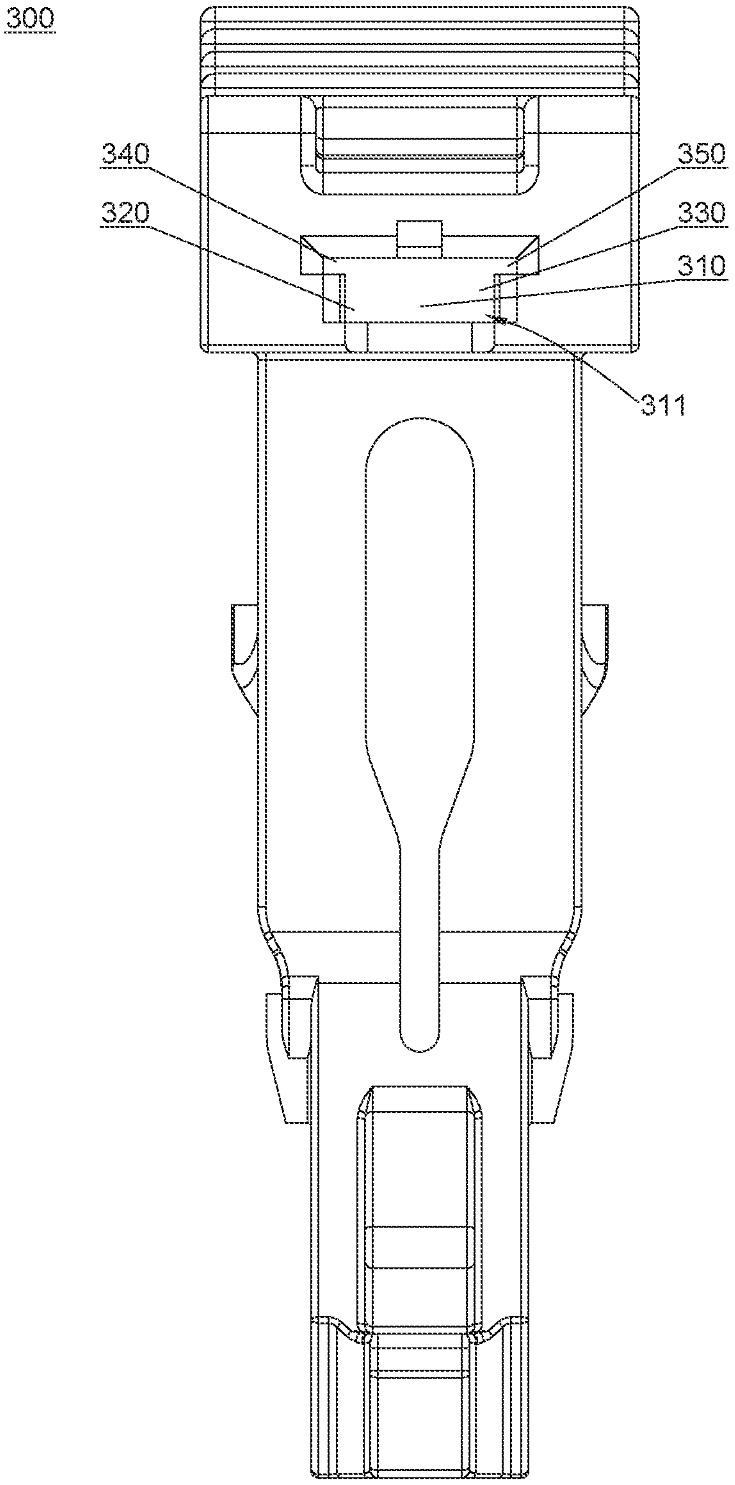
FIG. 9 is a front elevation view of the latch shown in FIG. 7.

As can be seen from FIG. 7, the latch 300 may include a body portion comprising a first end and a second end, bearing surfaces 702 on the body portion configured for engaging complementary bearing surfaces on the housing 200 of the electrical connector 100 to pivotably mount the latch 300 in the housing 200 such that the latch 300 pivots between at least the locked position and the unlocked position; a foot 704 extending from the boy portion at the first end, the foot configured to extend under a portion of a mating component such as the electronic card 900 mated to the electrical connector 100 when the latch 300 is pivoted into the locked position; and a head 706 coupled to the body portion a second end, the head 706 configured to extend into a notch of the mating component when the latch is pivoted into the locked position. The head 706 may include a locking groove 310.

As shown in FIGS. 5-9, the upper part of the latch 300 may be provided with the locking groove 310. The locking groove 310 may face the insulating housing 200. That is, the groove opening 311 of the locking groove 310 may face the insulating housing 200. When the latch 300 is at the locked position, the locking groove 310 may engage a flange of the electronic card 900 inserted in the slot 210. The flange may protrude from a side of the electronic card 900. In some embodiments, the electronic card 900 may inconspicuously include a protruding flange. For example, in embodiments shown in FIG. 2, a side of the electronic card 900 may be provided with a notch 920. When the latch 300 is at the locked position, the locking groove 310 may extend into the notch 920 to engage edges of the notch 920. A protrusion part below the notch 920 may be regarded as the flange 910. A part above the locking groove 310 of the latch 300 may be inserted into the notch 920. It should be appreciated that those skilled in the art can make the locking groove 310 engage the electronic card 900 connected to the slot 210 by appropriate modification.

As shown in FIGS. 1-2 and 4, both ends of the insulating housing 200 may be provided with latches 300, and the two latches 300 may be configured to lock respective sides of the electronic card 900. Locking grooves 310 in the two latches 300 may face each other. The two latches 300 may be of the same structure, and may be arranged in mirror image of each other.

As shown in FIGS. 10-14, the latch 300 may be provided with a clip 400. The clip 400 may be formed from materials such as metal by a sheet metal process or any suitable processes. The clip 400 may be an integral member. The clip 400 may include a clip main body 410, a first beam 420 and a second beam 430. The first beam 420 and the second beam 430 may be extend from opposite sides of the clip main body 410. The first beam 420 and the second beam 430 may be positioned on both sides of the clip main body 410, and may be respectively connected to the clip main body 410. The first beam 420, the second beam 430 and the clip main body 410 may form a C shaped after connected so as to substantially surround the locking groove 310. The inner end of the clip 400 may be embedded into the locking groove 310. The first beam 420 and the second beam 430 may be positioned on respective sides of the locking groove 310.

Figure 3B:
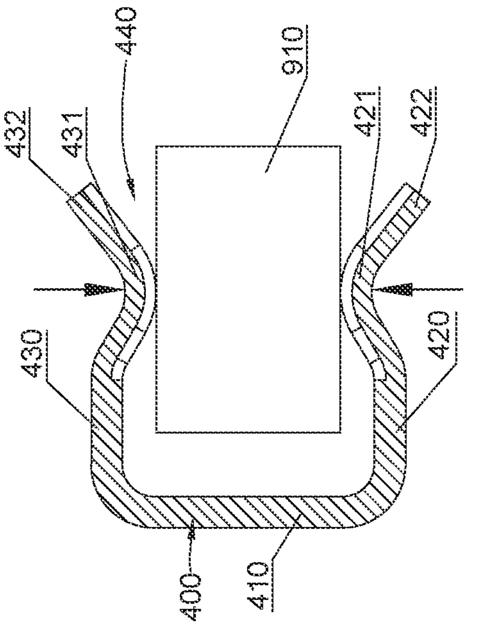
FIGS. 3A-3C are schematic diagrams of a clip of the electrical connector shown in FIG. 1 engaging a flange of a mating component, according to some embodiments.
Figure 3A:
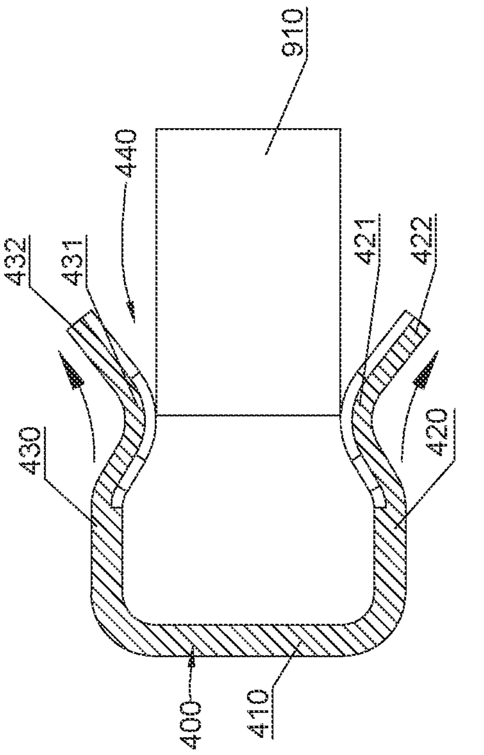

The first beam 420 and the second beam 430 may clamp the flange 910 of the electronic card 900. As shown in FIGS. 3A-3B, when the latch 300 moves from the unlocked position to the locked position, the locking groove 310 may gradually approach the flange 910, such that the clip 400 may gradually approach the flange 910. When the latch 300 is pivoted to the locked position, the first beam 420 and the second beam 430 may clamp the flange 910 so as to securely lock the electronic card 900 in the slot 210.

In the electrical connector 100 of the embodiment of the present disclosure, the locking groove 310 of the latch 300 may be provided with the clip 400, such that when the latch 300 is at the locked position, the first beam 420 and the second beam 430 may clamp the flange 910 along a lateral direction (for example, the transverse direction Y-Y shown in the figure). In this way, the mating component may be tightly connected to the latch 300 by the clip 400. The mating component may not shake relative to the latch 300 even if there may be a spacing between the flange 910 and a side wall of the locking groove 310 due to a machining tolerance. Therefore, the connection stability may be higher, and thus the mating component retained in the slot 210 may have better electrical performance. The clip 400, particularly the clip main body 410, may serve as a support beam to the latch 300 such that the mechanical strength of the latch 300 may be improved and the latch 300 may be more solid and durable.

Each of the first beam 420 and the second beam 430 may take a shape of an elastic beam. In the embodiment shown in the figure, inner ends of the first beam 420 and the second beam 430 may be connected to opposite sides of the clip main body 410. In this way, outer ends of the first beam 420 and the second beam 430 may have certain elasticity, thereby forming the elastic beam. “Inner ends” and “outer ends” mentioned herein may be relative to the locking groove 310, the end part close to the groove opening 311 of the locking groove 310 may be the outer end, and the end part away from the groove opening 311 may be the inner end. Alternatively or additionally, the first beam 420 and the second beam 430 may be made of elastic material, or with different modes such as a small wall thickness, such that each of the first beam 420 and the second beam 430 takes the shape of the elastic beam. Referring to FIGS. 3A-3B, when the latch 300 moves from the unlocked position to the locked position, the flange 910 may abut against the first beam 420 and the second beam 430, to push the first beam 420 and the second beam 430 away from each other, as indicated by arrows in FIG. 3A. When the latch 300 moves to the locked position, the first beam 420 and the second beam 430 may tightly clamp the flange 910, as indicated by arrows in FIG. 3B. Therefore, by such setting, the strength with which the first beam 420 and the second beam 430 clamp the flange 910 may be higher, such that the mating component may be tightly connected to the latch 300 by the clip 400, the mating component may not shake, and the electrical connector 100 may have stable mechanical performance and electrical performance. Such a configuration may be applied to PCBs with a wide range of widths. Although the width of the flange 910 of a particular PCB may be larger or smaller, the flange 910 may be tightly clamped due to the elasticity property of the first beam 420 and the second beam 430. Therefore, the requirement on machining accuracy of the flange 910 may be degraded, and the electrical connector 100 can be widely used.

As shown in FIGS. 10-14, the first beam 420 may include a first curved portion 421. The second beam 430 may include a second curved portion 431. Both the first curved portion 421 and the second curved portion 431 may curve inwards the locking groove 310. In other words, both the first curved portion 421 and the second curved portion 431 may protrude inwards the locking groove 310. The first curved portion 421 and the second curved portion 431 may extend into the locking groove 310 and configured to clamp the flange 910. In this way, when the latch 300 moves, a friction force between the first beam 420 and the second beam 430 and the flange 910 may be small, thereby reducing the abrasion degree of the first beam 420, the second beam 430 and the flange 910 caused by friction, and prolonging the service life of the first beam 420, the second beam 430 and the flange 910.

Figure 10:
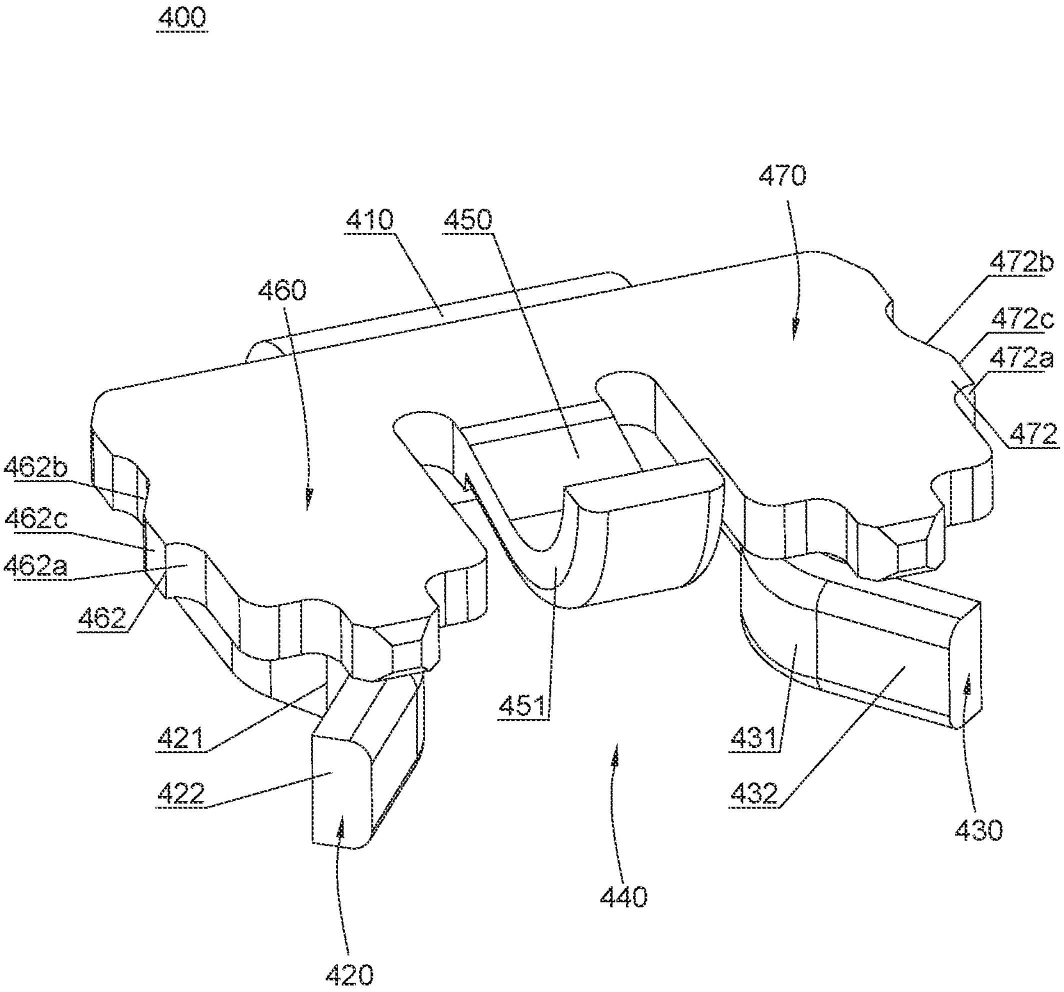
FIG. 10 is a top, front perspective view of the clip shown in FIG. 5.
Figure 11:
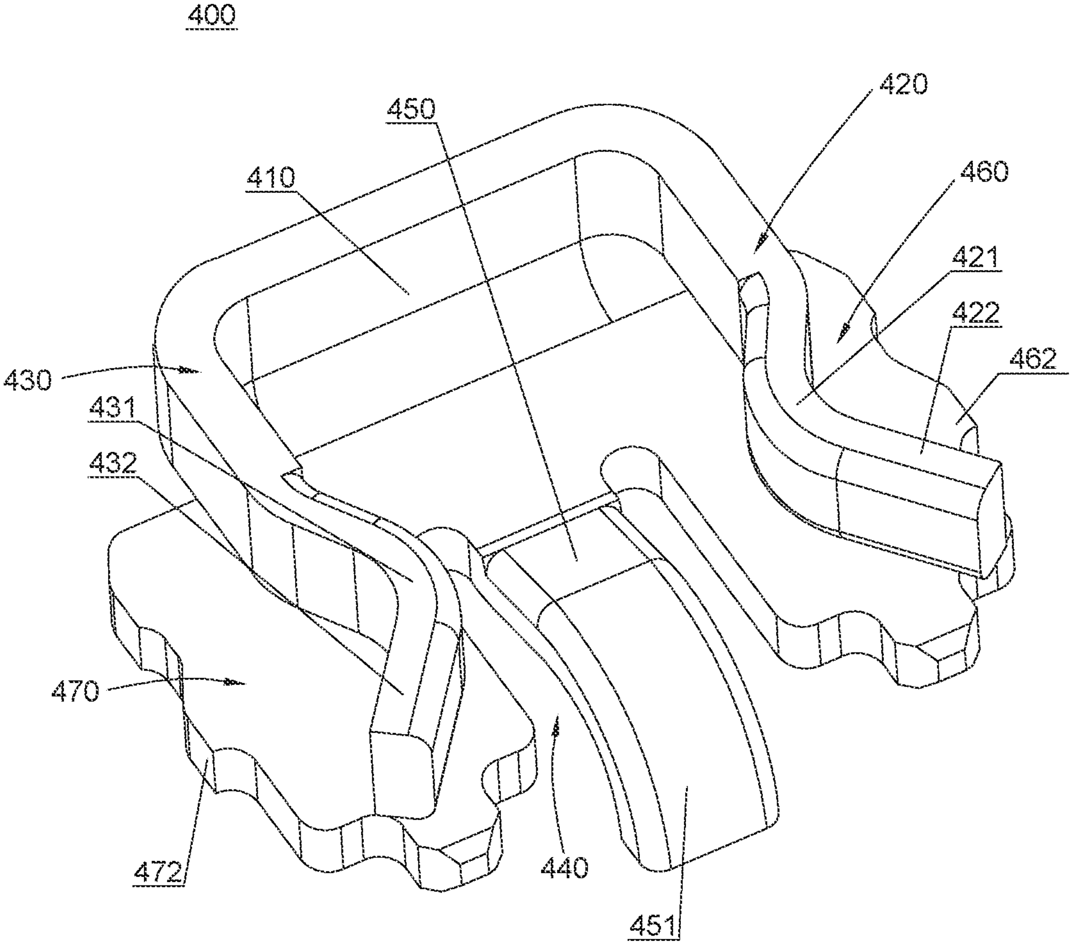
FIG. 11 is a bottom, front perspective view of the clip shown in FIG. 10.
Figure 12:
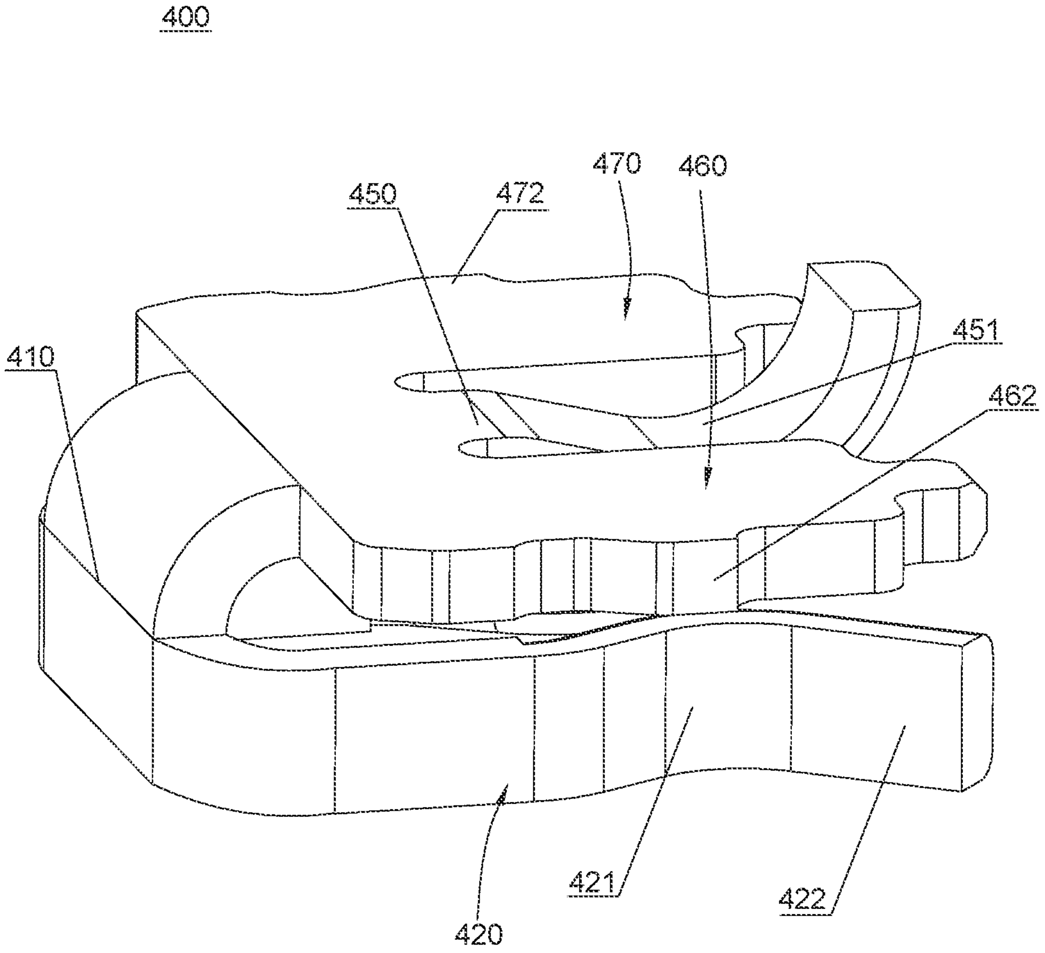
FIG. 12 is a top, side perspective view of the clip shown in FIG. 10.

As shown in FIGS. 10-14, the first beam 420 may further include a first outer end portion 422. The first outer end portion 422 may be connected to the outer end of the first curved portion 421. The second beam 430 may further include a second outer end portion 432. The second outer end portion 432 may be connected to the outer end of the second curved portion 431. The first outer end portion 422 and the second outer end portion 432 may be positioned at the groove opening 311 of the locking groove 310 to form a clip opening 440 of the clip 400. The flange 910 may be inserted into the clip 400 from the clip opening 440. The clip opening 440 may be of an incremental size towards the outer side of the locking groove 310. Specifically, as shown in FIG. 10, the first outer end portion 422 may extend towards the left side obliquely from the first curved portion 421. The second outer end portion 432 may extend towards the right side obliquely from the second curved portion 431. In this way, the clip opening 440 may be horn-shaped. The maximum width of the clip opening 440 may be bigger than the width of the groove opening 311.

Referring to FIGS. 3A-3B, when the latch 300 moves from the unlocked position to the locked position, the flange 910 may gradually approach the clip opening 440. In this way, the clip opening 440 may guide the flange 910 into the locking groove 310. Even if the latch 300 deviates in the moving process, the flange 910 may be guided since the maximum width of the clip opening 440 may be larger. The incremental clip opening 440 may direct the latch 300 into position and therefore ensure that the first beam 420 and the second beam 430 can clamp the flange 910.

Figure 3C:
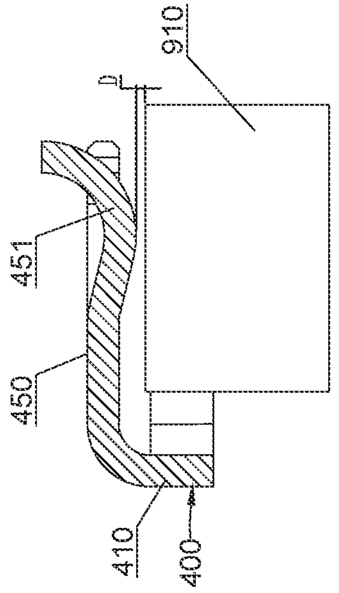

As shown in FIGS. 10-14, the clip 400 may further include a third beam 450. The third beam 450 may be connected to the clip main body 410. Referring to FIG. 3C, the third beam 450 may be positioned at the top of the locking groove 310. The third beam 450 may be configured as a limit and to block the flange 910, thereby preventing the mating component from dissociating from the slot 210.

As illustrated, the inner end of the third beam 450 may be connected to the clip main body 410. In this way, the outer end of the third beam 450 may be elastic, thereby forming the elastic beam. Alternatively or additionally, the third beam 450 may be made of elastic material, or with different modes such as a small wall thickness, such that the third beam 450 takes the shape of the elastic beam. Referring to FIG. 3C, when the latch 300 moves from the unlocked position to the locked position, if the mating component is not connected to the slot 210 in place, the third beam 450 may interfere with the flange 910. The elastic third beam 450 may be configured as a buffer and to prevent extrusion deformation or damage caused by interference of the third beam 450 with the flange 910.

As shown in FIGS. 10-14, the third beam 450 may include a third curved portion 451. The third curved portion 451 may curve inwards the locking groove 310. In other words, the third curved portion 451 may protrude inwards the locking groove 310. The third curved portion 451 may extend into the locking groove 310. In this way, when the latch 300 moves and if the third beam 450 interferes with the flange 910, the friction force between the third beam 450 and the flange 910 may be small, thereby reducing the abrasion degree of the third beam 450 and the flange 910 caused by friction, and prolonging the service life of the third beam 450 and the flange 910.

As shown in FIG. 3C, the spacing between the third curved portion 451 and the top of the flange 910 may be D, $-0.1\ \text{mm} \le D \le 0.1\ \text{mm}$. That is, when the mating component (electronic card 900) is connected to the slot 210 in place, there may be no spacing or only a small spacing between the third curved portion 451 and the top of the flange 910; or when the mating component is mounted to the slot 210, the top of the flange 910 may abut against the third curved portion 451, so that the third curve portion 451 may be pushed up. When the mating component may be connected to the slot 210 in place, the third curved portion 451 may reduce the displacement of the mating component in the vertical direction Z-Z. In this way, the abrasion of the mating component and the electrical connector 100 while shaking can be reduced, and the service life of the mating component and the electrical connector 100 can be prolonged.

As shown in FIGS. 5-9, the latch 300 may further be provided with a first fixing groove 320 and a second fixing groove 330. The first fixing groove 320 and the second fixing groove 330 may be recessed towards respective sides of the locking groove 310. The first beam 420 and the second beam 430 may be respectively mounted to the first fixing groove 320 and the second fixing groove 330. By setting the first fixing groove 320 and the second fixing groove 330, the first beam 420 and the second beam 430 may be positioned, to prevent the first beam 420 and the second beam 430 from being dissociated from an expected position, thereby ensuring the stability of performance of the electrical connector 100.

As shown in FIGS. 5-9, the inner end of the first beam 420 may be connected to the clip main body 410. The inner end of the second beam 430 may be connected to the clip main body 410. The clip main body 410, the inner end of the first beam 420 and the inner end of the second beam 430 may engage between the first fixing groove 320 and the second fixing groove 330. In this way, the outer end of the first beam 420 and the outer end of the second beam 430 may extend beyond the first fixing groove 320 and the second fixing groove 330. Such configuration may enable the first beam 420 and the second beam 430 elastic and the maximum width of the clip opening 440 to be greater than the width of the groove opening 311. The electrical connector 100 may have a more compact structure and lower manufacturing cost.

As shown in FIGS. 10-14, the clip 400 may further include a first holding part 460 and a second holding part 470. The first holding part 460 and the second holding part 470 may be respectively connected to the clip main body 410. The first holding part 460 and the second holding part 470 may be fixed to the latch 300 at the top of the locking groove 310. By setting the first holding part 460 and the second holding part 470, the clip 400 can be firmly fixed to the latch 300, thereby ensuring the stability of performance of the electrical connector 100.

As shown in FIGS. 10-14, the clip 400 may include the third beam 450, the third beam 450 may be positioned between the first holding part 460 and the second holding part 470. In this way, the clip 400 may be symmetrical and therefore easier manufacture.

As shown in FIGS. 10-14, the first holding part 460 may be positioned above the first beam 420. The second holding part 470 may be positioned above the second beam 430. The first holding part 460 may extend towards the outer side of the locking groove 310 and exceed the inner end of the first beam 420. The second holding part 470 may extend outwards the locking groove 310 and exceed the inner end of the second beam 430.

As shown in FIGS. 5-9, the latch 300 may further include a third fixing groove 340 and a fourth fixing groove 350. The third fixing groove 340 and the fourth fixing groove 350 may be recessed towards respective sides of the locking groove 310. Outer edges of the first holding part 460 and the second holding part 470 may be respectively inserted into the third fixing groove 340 and the fourth fixing groove 350. The third fixing groove 340 and the fourth fixing groove 350 may respectively extend to a surface where the groove opening 311 of the locking groove 310 may be located. By setting the third fixing groove 340 and the fourth fixing groove 350, the first holding part 460 and the second holding part 470 may be positioned to prevent the first holding part 460 and the second holding part 470 from dissociating from the expected position, thereby ensuring the stability of the performance of the electrical connector 100. The clip 400 may be mounted into the latch 300 through the groove opening 311. The first holding part 460 and the second holding part 470 may be respectively aligned to the third fixing groove 340 and the fourth fixing groove 350, and the first beam 420 and the second beam 430 may be aligned to the first fixing groove 320 and the second fixing groove 330 respectively and then inserted into the latch 300 directly.

As shown in FIGS. 5-14, the outer edge of the first holding part 460 may be provided with a first abutting protrusion 462. The first abutting protrusion 462 may abut against the third fixing groove 340. The first holding part 460 may abut against the side wall of the third fixing groove 340 by the first abutting protrusion 462. The outer edge of the second holding part 470 may be provided with a second abutting protrusion 472. The second abutting protrusion 472 may abut against the groove wall of the fourth fixing groove 350. The second holding part 470 may abut against the groove wall of the fourth fixing groove 350 by the second abutting protrusion 472. By setting the first abutting protrusion 462 and the second abutting protrusion 472, material consumption of the first holding part 460 and the second holding part 470 may be reduced, thereby reducing the cost of the electrical connector 100. In addition, the contact area between the first holding part 460 and the third fixing groove 340 and the contact area between the second holding part 470 and the fourth fixing groove 350 may be reduced, thereby reducing friction in the mounting process and being convenient in mounting; and in addition, the possibility that contact surfaces may be not mated because of unsmooth surfaces may further be reduced, and the requirement on machining accuracy may be reduced too.

Figure 13:
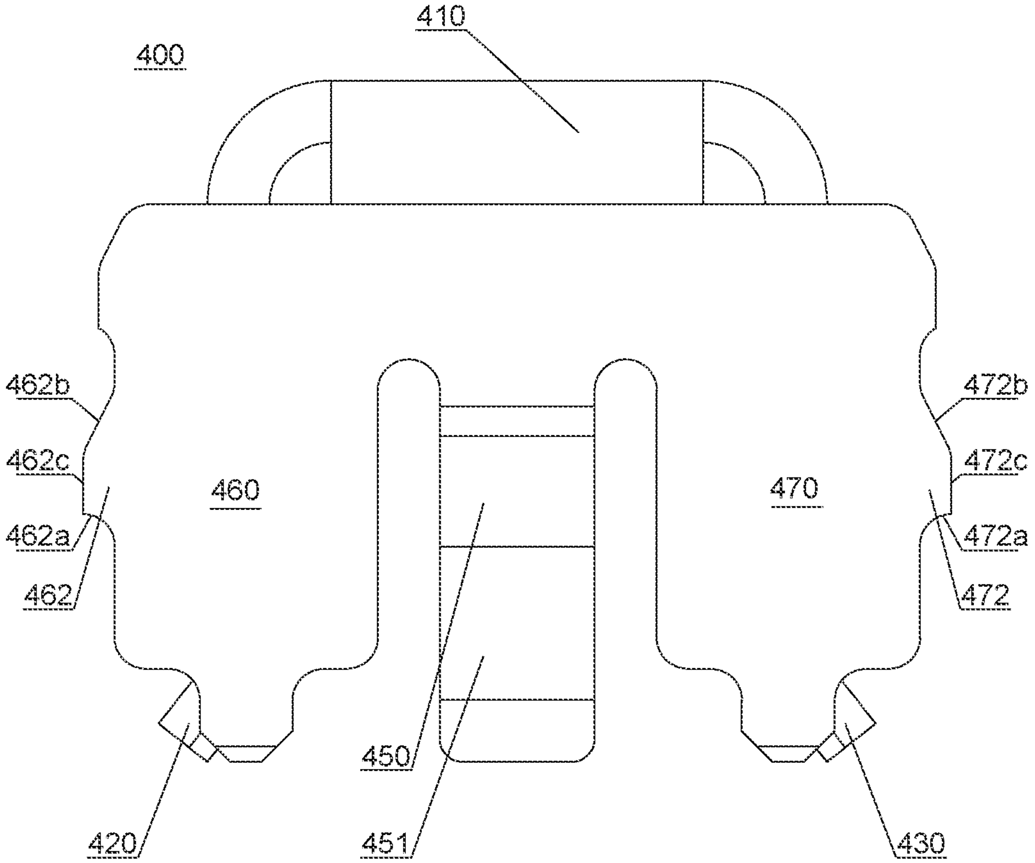
FIG. 13 is a top plan view of the clip shown in FIG. 10.
Figure 14:
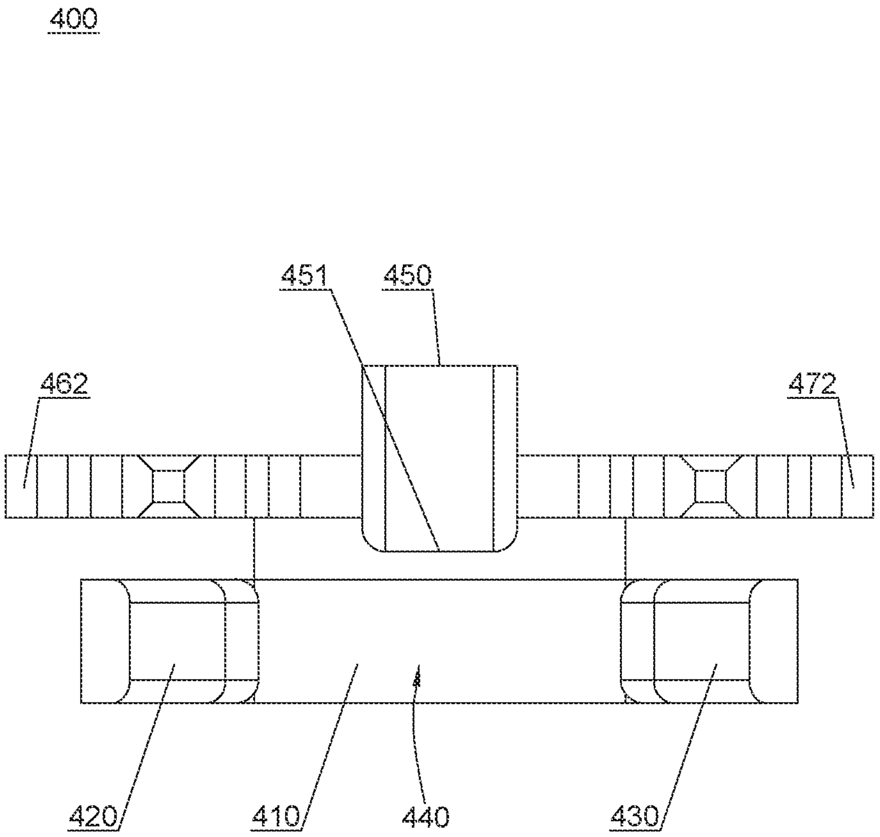
FIG. 14 is a front elevation view of the clip shown in FIG. 10.

As shown in FIGS. 10 and 13, the first abutting protrusion 462 may include a surface **462*a*, a surface 462*b* and a surface 462*c*. The surface 462*a*, the surface 462*b* and the surface 462*c* may enclose and form the first abutting protrusion 462. As illustrated, the surface 462*a* faces the groove opening 311, the surface 462*b* faces away from the groove opening 311, and the surface 462*c* connects the surface 462*a* and the surface 462*b*. The second abutting protrusion 472 may include a surface 472*a*, a surface 472*b*** and a surface

472*c*. The surface 472*a*, the surface 472*b* and the surface 472*c* may enclose and form the second abutting protrusion 472. As illustrated, the surface 472*a* faces the groove opening 311, the surface 472*b* faces away from the groove opening 311, and the surface 472*c* connects the surface 472*a* and the surface 472*b*. The surface 462*b* and the surface 472*b* may incline towards each other along a direction away from the groove opening 311. In this way, when the first holding part 460 and the second holding part 470 are respectively inserted into the third fixing groove 340 and the fourth fixing groove 350, the first abutting protrusion 462 and the second abutting protrusion 472 may play a guiding role, thereby correcting the deviated latch 300 and avoiding that the first holding part 460 and the second holding part 470 cannot be normally inserted into the third fixing groove 340 and the fourth fixing groove 350.

As shown in FIGS. 5-14, the first holding part 460 and the second holding part 470 may be spaced apart along the lateral direction (i.e. the transverse direction Y-Y) of the locking groove 310. It may enable the first holding part 460 and the second holding part 470 to be elastic. In this way, when the first holding part 460 and the second holding part 470 need to be respectively inserted into the third fixing groove 340 and the fourth fixing groove 350, a user may apply a force to make the first holding part 460 and the second holding part 470 approach each other, which reduces the spacing between the first holding part 460 and the second holding part 470, thereby making it easier to insert the first holding part 460 and the second holding part 470 into the third fixing groove 340 and the fourth fixing groove 350 respectively. When the first holding part 460 and the second holding part 470 have been respectively inserted into the third fixing groove 340 and the fourth fixing groove 350, the force may be removed, and the first holding part 460 and the second holding part 470 may return to an original shape under the action of an elastic potential energy, and thus respectively securely positioned in the third fixing groove 340 and the fourth fixing groove 350.

The present disclosure has been described through the above embodiments. It may be understood by a person skilled in the art that a variety of variations, modifications and improvements may be made according to the teaching of the present disclosure, and these variations, modifications and improvements all fall within the spirit and scope of protection of the present disclosure. The scope of protection of the present disclosure is defined by the claims and its equivalent scope. The above embodiments are only for the purpose of illustration and description, and may not limit the present disclosure to the scope of the described embodiments.

Various variations may be made to the structures illustrated and described herein. For example, the clip described above is used in a card edge connector, but the clip can also be used in any suitable electrical connector, such as backplane connectors, daughter card connectors, stacking connectors, Mezzanine connectors, I/O connectors, chip sockets, Gen Z connectors, etc. When these connectors are in use, they may encounter the problem of insufficient stability, and the clip may enable stronger connectors and more secure attachment between the connectors and respective mating components.

Moreover, although many creative aspects have been described above with reference to the vertical connectors, it should be understood that the aspects of the present disclosure may not be limited to these. Any one of the creative features, whether alone or combined with one or more other creative features, may be used for other types of electrical connectors, such as right angle connectors and coplanar connectors.

In the description of the present disclosure, it is to be understood that orientation or positional relationships indicated by orientation words "front", "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not limit the present disclosure. The orientation words "inside" and "outside" refer to the inside and outside relative to the contour of each component itself.

For facilitating description, the spatial relative terms such as "on", "above", "on an upper surface of" and "upper" may be used herein to describe a spatial position relationship between one or more components or features and other components or features shown in the accompanying drawings. It should be understood that the spatial relative terms may include the orientations of the components shown in the accompanying drawings and/or different orientations in use or operation. For example, if the component in the accompanying drawings is turned upside down completely, the component "above other components or features" or "on other components or features" may include the case where the component is "below other components or features" or "under other components or features". Thus, the exemplary term "above" may encompass both the orientations of "above" and "below". In addition, these components or features may be otherwise oriented (for example rotated by 90 degrees or other angles) and the present disclosure may include all these cases.

It should be noted that the terms used herein are only for describing specific embodiments, and may not limit the exemplary embodiments according to the present application. As used herein, an expression of a singular form includes an expression of a plural form unless otherwise indicated. In addition, the use of "including", "comprising", "having", "containing", or "involving", and variations thereof herein, is meant to encompass the items listed thereafter (or equivalents thereof) and/or as additional items.

It should be noted that the terms "first", "second" and the like in the description and claims of the present disclosure are used to distinguish similar objects, but not necessarily used to describe a specific order or precedence order. It should be understood that ordinal numbers used in this way may be interchanged as appropriate, so that the embodiments of the present disclosure described herein may be implemented in a sequence other than those illustrated or described herein.

What is claimed is:

1. A latch assembly for a card edge connector, the card edge connector comprising a housing having a base portion extending in a longitudinal direction, the latch assembly comprising:

a latch comprising:

a body portion comprising a first end and a second end;

bearing surfaces on the body portion configured for engaging complementary bearing surfaces on the housing of the card edge connector to pivotably mount the latch in the housing such that the latch pivots between at least a locked position and an unlocked position;

a foot extending from the body portion at the first end, the foot configured to extend under a portion of a card inserted in the card edge connector when the latch is pivoted into the locked position; and a head coupled to the body portion at the second end, the head configured to extend into a notch of a mating component mated to the card edge connector when the latch is pivoted into the locked position, wherein the head comprises:

a groove comprising first and second recessed portions; and a clip disposed in the groove and configured for engaging a mating component when the mating component is inserted into the base portion of the card edge connector and the latch is pivoted into the locked position, the clip comprising a body, a first beam disposed in the first recessed portion of the groove, and a second beam disposed in the second recessed portion of the groove.

2. The latch assembly of claim 1, wherein:

the clip is configured to restrain movement of the mating component in a transverse direction perpendicular to the longitudinal direction.

3. The latch assembly of claim 2, wherein:

the clip is configured to restrain movement of the mating component in a vertical direction perpendicular to the longitudinal direction and transverse direction.

4. The latch assembly of claim 3, wherein:

the first and second beams are configured to engage one side and a top of the notch of the mating component.

5. The latch assembly of claim 2, wherein:

the first and second beams are configured to engage opposite sides of the mating component.

6. The latch assembly of claim 5, wherein:

each of the first and second beams of the clip comprises a curved portion extending into the groove of the latch so as to engage the opposite sides of the mating component.

7. The latch assembly of claim 6, wherein:

each of the first and second beams of the clip comprises an end portion extending from the curved portion and configured to guide the mating component to engage the curved portion.

8. The latch assembly of claim 1, wherein:

the first beam comprises a first curved portion;

the second beam comprises a second curved portion; and the first curved portion and the second curved portion are configured to curve towards each other and extend into the groove so as to engage the mating component when the latch is in the locked position.

9. An electrical connector comprising:

a housing comprising a slot elongated in a longitudinal direction;

a latch pivotably connected to the housing between a locked position and an unlocked position, the latch comprising an upper part having a groove facing the housing; and a clip comprising a body and a first beam and a second beam disposed on opposite sides of the groove for engaging a mating component inserted into the slot of the housing when the latch is in the locked position, wherein:

the first beam comprises a first curved portion;

the second beam comprises a second curved portion; and the first curved portion and the second curved portion curve towards each other and extend into the groove so as to engage the mating component inserted into the slot of the housing when the latch is in the locked position.

10. The electrical connector of claim 9, wherein:

the groove of the latch comprises first and second recessed portions;

the first beam of the clip is disposed in the first recessed portion; and the second beam of the clip is disposed in the second recessed portion.

11. The electrical connector of claim 9, wherein:

the first beam further comprises a first end portion connected to the first curved portion;

the second beam further comprises a second end portion connected to the second curved portion;

the first end portion and the second end portion are positioned at a groove opening of the groove so as to form a clip opening of the clip; and a maximum width of the clip opening in a transverse direction perpendicular to the longitudinal direction is bigger than a width of the groove opening in the transverse direction.

12. The electrical connector of claim 9, wherein the clip further comprises a third beam disposed at a top of the groove.

13. The electrical connector of claim 12, wherein:

the third beam comprises a third curved portion;

the third curved portion curves inwards the groove and extends into the groove; and a spacing between the third curved portion and a top of a flange of the mating component is between −0.1 mm and 0.1 mm when the mating component is inserted into the slot and the latch is in the locked position.

14. The electrical connector of claim 9, wherein:

the clip further comprises a first holding part and a second holding part connected to the body;

the first holding part and the second holding part are fixed to the latch at a top of the groove; and the first holding part and the second holding part are positioned above the first beam and the second beam, respectively.

15. A system comprising:

an electrical connector of claim 9; and a component inserted into the slot of the housing of the electrical connector, wherein:

the first and second beams of the clip engage the component from opposite sides so as to restrain movement of the component in a transverse direction perpendicular to the longitudinal direction.

16. An electrical connector comprising:

a housing comprising a base portion extending in a longitudinal direction;

a pair of latches pivotably disposed at opposite ends of the base portion of the housing, each of the pair of latches extending in a vertical direction perpendicular to the longitudinal direction and comprising a groove disposed above the base portion of the housing; and a pair of clips disposed in the grooves of respective ones of the pair of latches, wherein:

each clip of the pair comprises a body, first and second beams extending from opposite sides of the body, and a first holding part and a second holding part connected to the body, the first holding part and the second holding part positioned above the first beam and the second beam, respectively.

17. The electrical connector of claim 16, wherein:

the pair of clips are configured to restrain movement of a mating component inserted in the base portion of the housing in the longitudinal direction, the vertical direction, and a transverse direction perpendicular to the longitudinal direction and the vertical direction when the pair of latches are in a locked position.

18. The electrical connector of claim 16, wherein:

each clip of the pair comprises a third beam extending from a top of the body and disposed between the first and second beams.

19. The electrical connector of claim 18, wherein:

each of the first, second and third beams comprises a portion curving into the groove so as to engage a mating component from three different sides.

20. A system comprising:

an electrical connector of claim 16; and a component inserted in the base portion of the housing of the electrical connector, wherein:

the pair of clips restrain movement of the component in the longitudinal direction, the vertical direction, and a transverse direction perpendicular to the longitudinal direction and the vertical direction when the pair of latches are in a locked position.

* * * * *